(12) United States Patent
Wilkinson

(10) Patent No.: US 10,274,267 B1
(45) Date of Patent: Apr. 30, 2019

(54) HEAT-SHRINK BRACKET

(71) Applicant: DENSO International America, Inc., Southfield, MI (US)

(72) Inventor: Marcus Wilkinson, Ferndale, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/933,988

(22) Filed: Mar. 23, 2018

(51) Int. Cl.
  *F28F 9/00* (2006.01)
  *F28F 9/007* (2006.01)
  *B65B 53/02* (2006.01)

(52) U.S. Cl.
  CPC .............. *F28F 9/002* (2013.01); *B65B 53/02* (2013.01); *F28F 9/0075* (2013.01)

(58) Field of Classification Search
  CPC .. F28F 9/002; F28F 9/0075; F28F 9/02; F28F 9/00; F28F 9/007; F28F 9/162; B65B 53/02
  USPC .......................................... 165/67, 172, 175
  See application file for complete search history.

(56) References Cited

U.S. PATENT DOCUMENTS

| | | | | | |
|---|---|---|---|---|---|
| 5,560,425 | A | * | 10/1996 | Sugawara | F28D 1/0316 165/148 |
| 6,170,785 | B1 | * | 1/2001 | Lampropoulos | A61M 5/1408 248/220.21 |
| 7,040,380 | B1 | * | 5/2006 | O'Brien | F28F 9/002 165/149 |
| 7,575,211 | B2 | * | 8/2009 | Andritter | F01P 11/08 180/68.4 |
| 2006/0054306 | A1 | * | 3/2006 | Kent | F28F 9/002 165/67 |
| 2012/0199318 | A1 | * | 8/2012 | Dittly | F28F 9/0251 165/67 |
| 2014/0326434 | A1 | * | 11/2014 | Farlow | F28F 9/007 165/67 |

FOREIGN PATENT DOCUMENTS

JP             03121932 A   *  5/1991   ............ F28F 9/002

* cited by examiner

*Primary Examiner* — Tho V Duong
(74) *Attorney, Agent, or Firm* — Harness, Dickey & Pierce, P.L.C.

(57) ABSTRACT

A bracket for mounting a heat exchanger to a mounting structure. The bracket includes a heat exchanger engagement portion having a heat-shrink material configured to contract and shrink onto a portion of the heat exchanger when heated to secure the heat exchanger engagement portion to the heat exchanger. A mounting portion extends from the heat exchanger engagement portion and is configured to be affixed to the mounting structure to rigidly mount the heat exchanger.

19 Claims, 3 Drawing Sheets

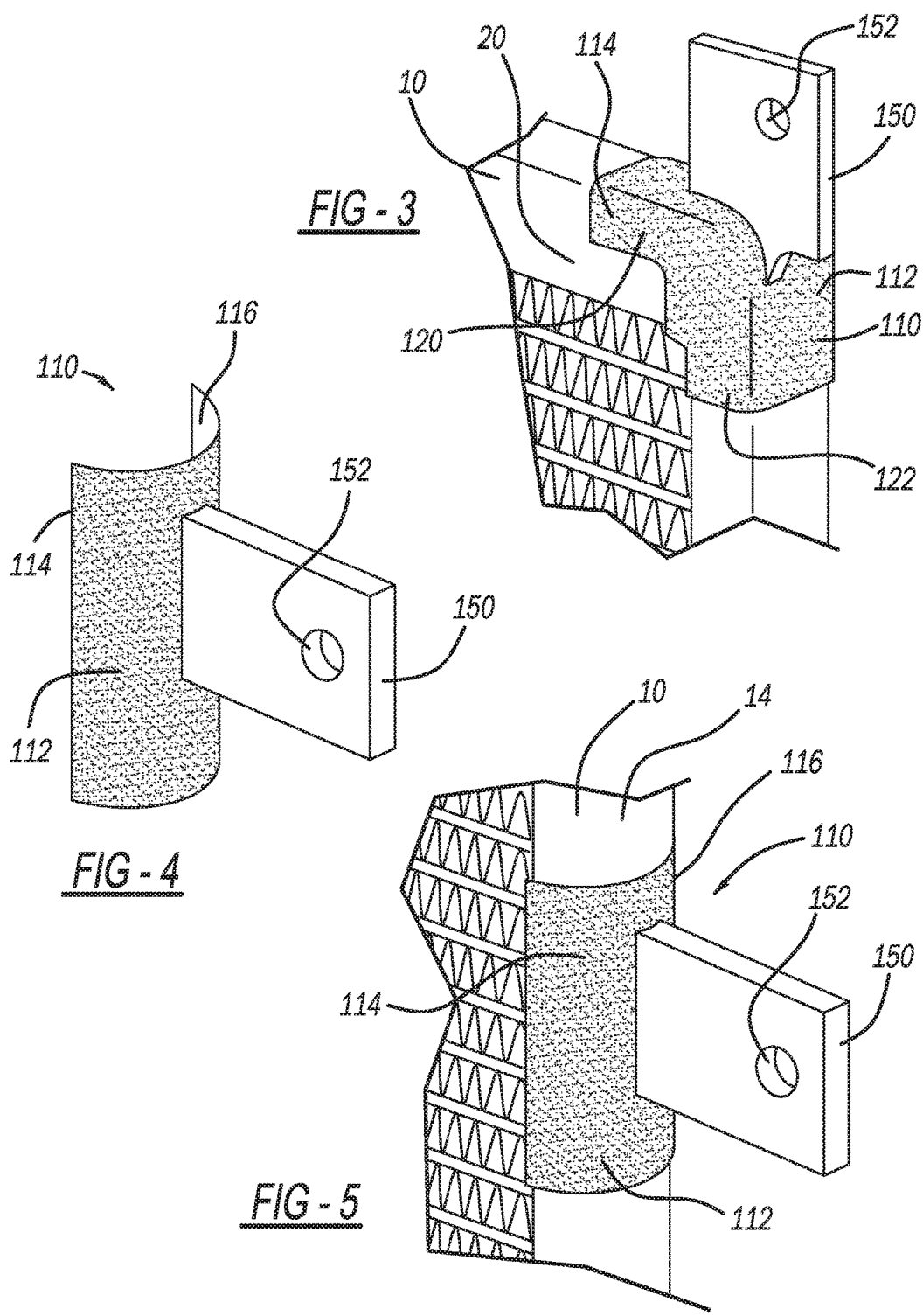

HEAT-SHRINK BRACKET

FIELD

The present disclosure relates to a bracket for mounting a heat exchanger to a mounting structure, such as a mounting structure of a vehicle.

BACKGROUND

This section provides background information related to the present disclosure, which is not necessarily prior art.

To utilize a heat exchanger for an automotive application, a bracket is affixed to the heat exchanger. The bracket is then affixed to a structure to rigidly secure the heat exchanger during operation of the vehicle. Traditionally, the bracket is affixed to the heat exchanger with bolts, a snap-together, welded joint, or brazed joint. Such means for affixing the bracket to the heat exchanger are typically costly, difficult to manufacture, difficult to control, and difficult to install. The present disclosure advantageously provides for improved heat exchanger brackets, which can be coupled to the heat exchanger without the need for bolts, a snap-together, or welded/brazed joints. The brackets of the present disclosure provide numerous additional advantages, as explained in detail herein and as one skilled in the art will appreciate.

SUMMARY

This section provides a general summary of the disclosure, and is not a comprehensive disclosure of its full scope or all of its features.

The present disclosure includes a bracket for mounting a heat exchanger to a mounting structure. The bracket includes a heat exchanger engagement portion having a heat-shrink material configured to contract and shrink onto a portion of the heat exchanger when heated to secure the heat exchanger engagement portion to the heat exchanger. A mounting portion extends from the heat exchanger engagement portion and is configured to be affixed to the mounting structure to rigidly mount the heat exchanger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 3 illustrates the bracket of FIGS. 2A and 2B mounted to a corner of the heat exchanger of FIG. 1;

FIG. 4 is a perspective view of another exemplary bracket according to the present disclosure for mounting the heat exchanger of FIG. 1 to the mounting structure;

FIG. 5 illustrates the bracket of FIG. 4 mounted to a header tank of the heat exchanger of FIG. 1;

Corresponding reference numerals indicate corresponding parts throughout the several views of the drawings.

DETAILED DESCRIPTION

Example embodiments will now be described more fully with reference to the accompanying drawings.

Figure 1:
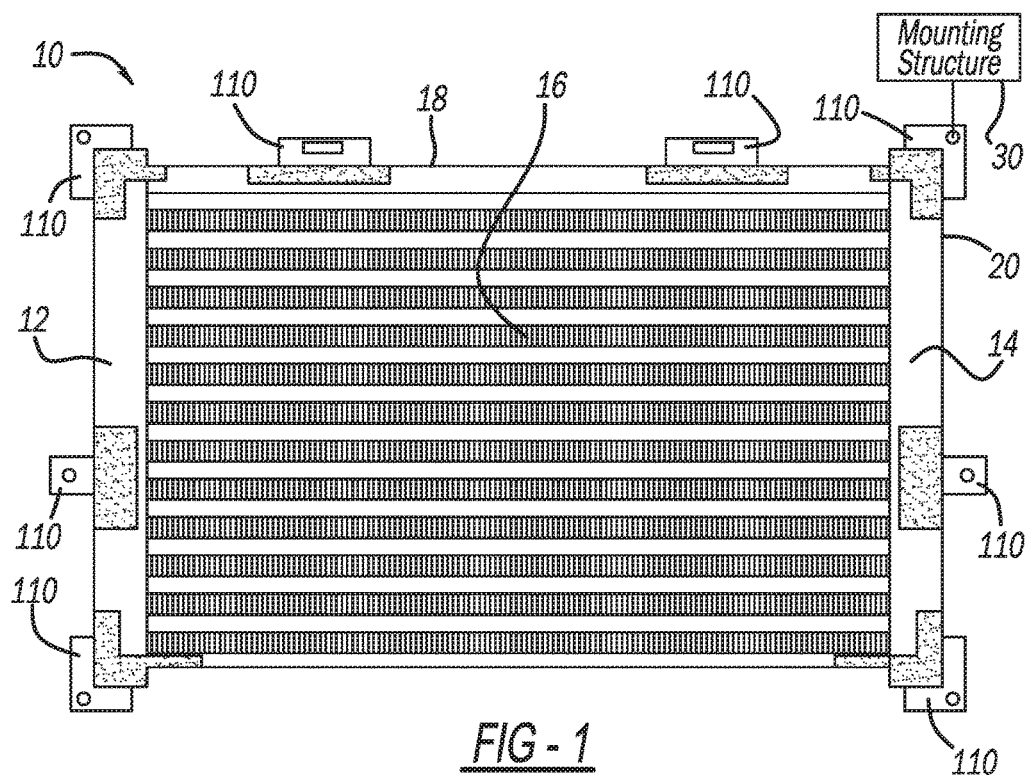
FIG. 1 illustrates an exemplary heat exchanger and mounting structure.

With initial reference to FIG. 1, an exemplary heat exchanger is illustrated at reference numeral 10. The heat exchanger 10 may be any suitable heat exchanger, such as a radiator for a vehicle. In the example illustrated, the heat exchanger 10 includes a first header tank 12 and a second header tank 14. Between the first header tank 12 and the second header tank 14 is a core 16. The core 16 includes a plurality of tubes extending between the first header tank 12 and the second header tank 14, through which fluid to be cooled is circulated.

As described in detail herein, the present disclosure includes various brackets that can be mounted to the heat exchanger 10 at any suitable locations, such as at a side plate 18, a corner 20, or at either one of the first header tank 12 or the second header tank 14. The brackets are for mounting the heat exchanger 10 to any suitable mounting structure 30, such as any suitable mounting structure of a vehicle. The mounting structure 30 may be or include any suitable mounting structure for rigidly securing the heat exchanger 10, such as a vehicle frame, vehicle chassis, or a secondary heat exchanger, for example.

Figures 2A, 2B:
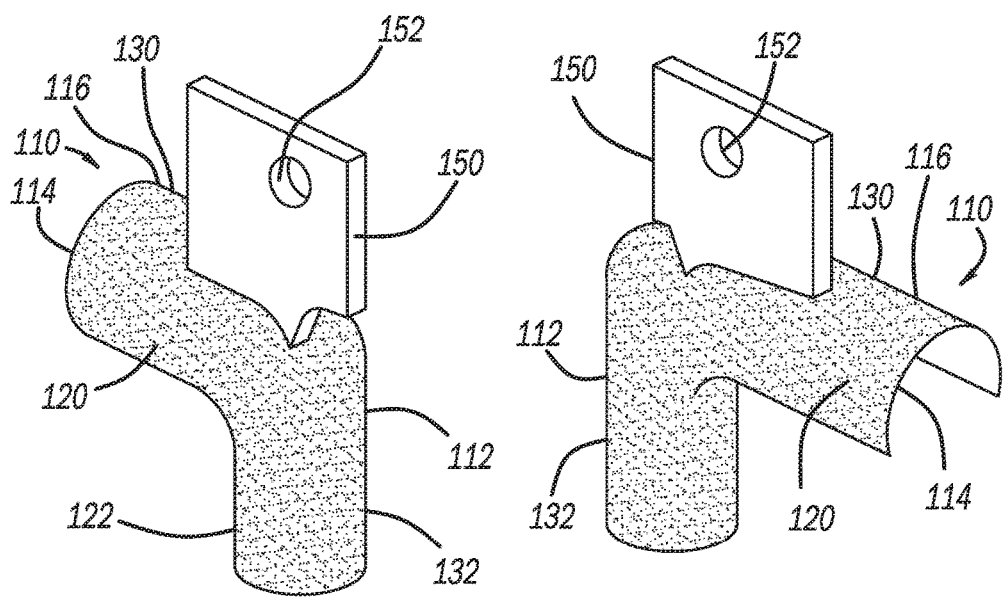
FIG. 2A is a perspective view of an exemplary bracket according to the present disclosure for mounting the heat exchanger of FIG. 1 to the mounting structure.
FIG. 2B is another perspective view of the bracket of FIG. 2A.

FIGS. 2A and 2B illustrate an exemplary bracket 110 in accordance with the present disclosure for mounting the heat exchanger 10 to the mounting structure 30. The bracket 110 generally includes a heat exchanger engagement portion 112 and a mounting portion 150. The heat exchanger engagement portion 112 includes a first sidewall (or first part) 114 and a second sidewall (or second part) 116. The first sidewall 114 includes a first portion 120 and a second portion 122, which is arranged generally at a right angle relative to the first portion 120. Similarly, the first portion 130 and the second portion 132 are generally at right angles relative to one another. The exemplary bracket 110 is thus sized and shaped to receive the corner 20 of the heat exchanger 10 between the first sidewall 114 and the second sidewall 116, as illustrated in FIG. 3 for example. The bracket 110 may be shaped in any suitable manner, particularly the heat exchanger engagement portion 112 thereof, to facilitate coupling of the heat exchanger engagement portion 112 to any suitable part of the heat exchanger 10, or any other suitable heat exchanger.

The heat exchanger engagement portion 112 is made of a heat-shrink material. Any suitable heat-shrink material may be used, such as any suitable heat-shrink material including a polymer, a resin, and/or a rubber based plastic. When the heat shrink material of the heat exchanger engagement portion 112 is heated above a predetermined temperature, the heat-shrink material is configured to shrink and contract onto the corner 20 (or any other suitable portion of the heat exchanger 10) to secure the heat exchanger engagement portion to the heat exchanger 10, as illustrated in FIG. 3. Specifically, the first sidewall 114 and the second sidewall 116 are configured to shrink and contract onto the corner 20 to rigidly secure the heat exchanger engagement portion 112 to the heat exchanger 10.

The mounting portion 150 of the bracket 110 is integral with the heat exchanger engagement portion 112. The mounting portion 150 can be formed of the same material as the heat exchanger engagement portion 112, or a different material. The mounting portion 150 and the heat exchanger engagement portion 112 may be formed integral with one another (e.g., monolithic), or formed separately and connected together in any suitable manner (such as bonded together in any suitable manner, including with an adhesive for example). The heat exchanger engagement portion 112 and the mounting portion 150 may be formed from a film of the same material, for example. The film of the heat exchanger engagement portion 112 may be formed thinner than the mounting portion 150. The heat exchanger engagement portion 112 and the mounting portion 150 may also be formed of two different materials, which may be overmolded. For example, the heat exchanger engagement portion 112 may be molded of a heat-shrink material, and the mounting portion 150 may be formed of any other suitable material and overmolded onto the heat exchanger engagement portion 112.

The mounting portion 150 defines an aperture 152. The aperture 152 may be of any suitable shape, and may be at any suitable orientation. For example, the aperture 152 may be a circular aperture, an elongated slot, a square aperture, etc. The aperture 152 is configured to receive any suitable fastener to facilitate coupling of the mounting portion 150 to the mounting structure 30.

With additional reference to FIGS. 4 and 5, the bracket 110 may be configured to be coupled to the first header tank 12 or the second header tank 14 of the heat exchanger 10. Specifically, the heat exchanger engagement portion 112 is configured such that the first sidewall 114 and the second sidewall 116 extend linearly, rather than at right angles as illustrated in FIGS. 2A, 2B, and 3. The first sidewall 114 and the second sidewall 116 are curved, so as to closely abut the first header tank 12 or the second header tank 14. The heat-shrink material of the heat exchanger engagement portion 112 is configured to shrink and contract onto the first header tank 12 or the second header tank 14 when the heat exchanger engagement portion 112 is heated to above a predetermined temperature in order to secure the heat exchanger engagement portion 112 to the first header tank 12 or the second header tank 14.

Figure 6:
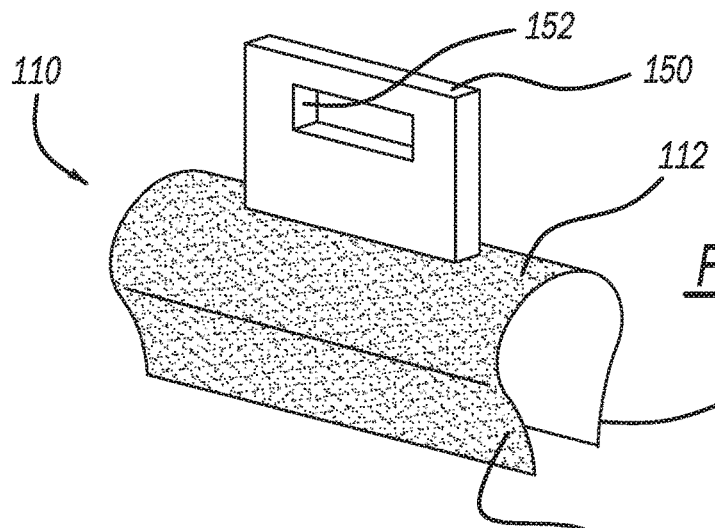
FIG. 6 is a perspective view of still another exemplary bracket according to the present disclosure for mounting the heat exchanger of FIG. 1 to the mounting structure.
Figure 7:
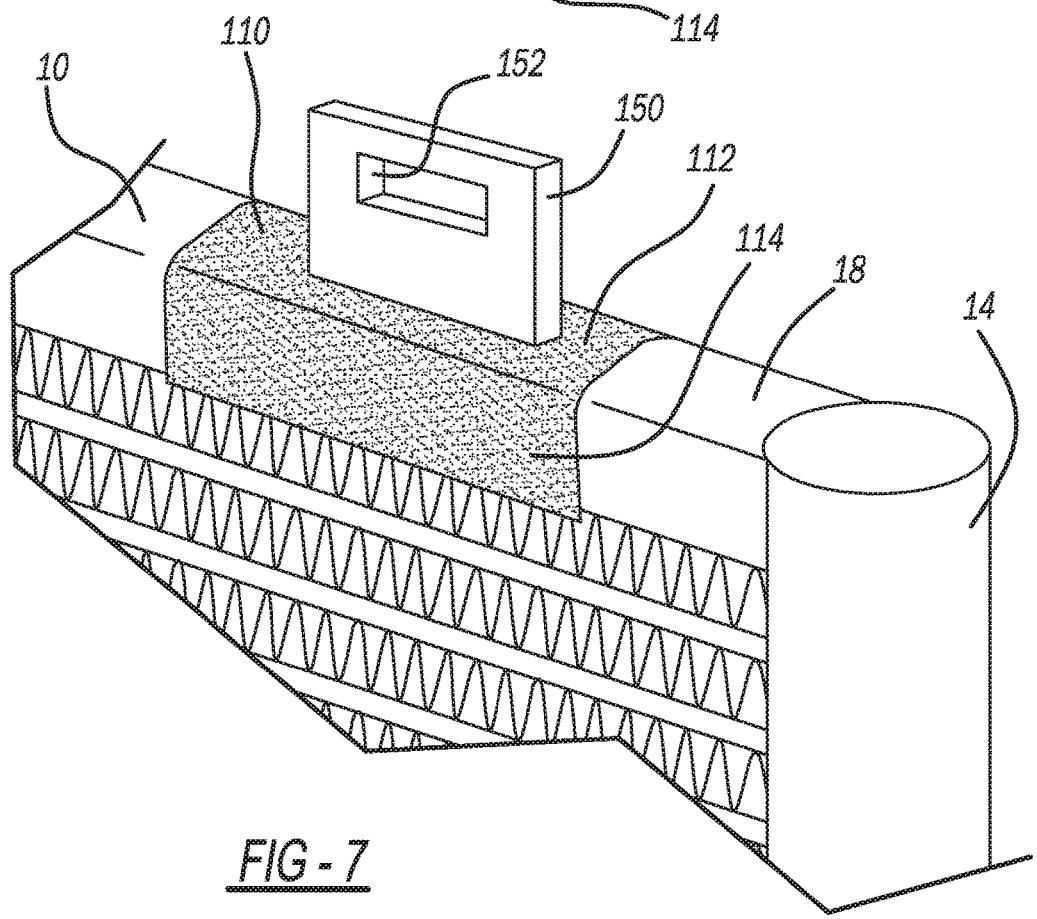
FIG. 7 illustrates the bracket of FIG. 6 mounted to a side plate of the heat exchanger of FIG. 1.

With reference to FIGS. 6 and 7, the bracket 110 may be configured to be mounted to the side plate 18 of the heat exchanger 10. Specifically, the first sidewall 114 and the second sidewall 116 may be configured to extend linearly, and may be rounded and curved towards one another to facilitate receipt of the side plate 118 therebetween. When the heat exchanger engagement portion 112 is heated to above a predetermined temperature, the first sidewall 114 and the second sidewall 116 are configured to shrink and contract onto the side plate 18 in order to secure the bracket 110 to the side plate 18. The aperture 152 may also be shaped as a slot as illustrated in FIGS. 6 and 7 to facilitate coupling of the mounting portion 150 to the mounting structure 30, such as with any suitable fastener.

The present disclosure thus advantageously provides for a bracket 110 having a heat exchanger engagement portion 112 made of a heat-shrink material, which is configured to shrink and contract onto any suitable portion of the heat exchanger 10 when heated above a predetermined temperature in order to secure the bracket 110 to the heat exchanger 10. The mounting portion 150, which may be configured as a flange, can then be secured to the mounting structure 30 in any suitable manner, such as with any suitable fastener seated within the aperture 152. The bracket 110 thus advantageously "molds" to the heat exchanger 10 and absorbs tolerance, which increase use possibilities and provides a secure and perfect fit. This eliminates any need for addressing tolerance issues, such as tolerance issues experienced with traditional brackets secured to the heat exchanger 10 with a clip, fastener, or snap fit. The bracket 110 is also well suited for attachment to the heat exchanger 10 as part of a service procedure, such as to replace a broken conventional bracket. One skilled in the art will appreciate that the brackets 110 according to the present teachings provide numeral additional advantages and unexpected results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A bracket for mounting a heat exchanger to a mounting structure comprising:
    a heat exchanger engagement portion including a heat-shrink material configured to contract and shrink onto a portion of the heat exchanger when heated to secure the heat exchanger engagement portion to the heat exchanger; and
    a mounting portion extending from the heat exchanger engagement portion and configured to be affixed to the mounting structure to rigidly mount the heat exchanger;
    wherein the heat-shrink material includes a film having a first thickness; and
    wherein the mounting portion has a second thickness that is greater than the first thickness.

2. The bracket of claim 1, wherein the heat exchanger engagement portion includes a first part and a second part spaced apart from the first part to receive the portion of the heat exchanger therebetween.

3. The bracket of claim 1, wherein the heat exchanger engagement portion and the mounting portion are integral.

4. The bracket of claim 1, wherein the mounting portion is a flange.

5. The bracket of claim 1, wherein the mounting portion defines an aperture for connecting the mounting portion to one of a vehicle frame, vehicle chassis, and a secondary heat exchanger.

6. A bracket for mounting a heat exchanger to a mounting structure comprising:
    a heat exchanger engagement portion including a first sidewall and a second sidewall spaced apart from the first sidewall to receive a portion of the heat exchanger therebetween, the first sidewall and the second sidewall include a heat-shrink material configured to shrink when heated to contract the first sidewall and the second sidewall onto the portion of the heat exchanger to secure the heat exchanger engagement portion to the heat exchanger; and
    a mounting portion extending from the heat exchanger engagement portion and configured to be affixed to the mounting structure to rigidly mount the heat exchanger;
    wherein the heat-shrink material includes a film having a first thickness; and
    wherein the mounting portion has a second thickness that is greater than the first thickness.

7. The bracket of claim 6, wherein the heat-shrink material includes a polymer.

8. The bracket of claim 6, wherein the heat-shrink material includes a resin.

9. The bracket of claim 6, wherein the heat-shrink material includes a rubber-based plastic.

10. The bracket of claim 6, wherein the heat exchanger engagement portion and the mounting portion include a common material.

11. The bracket of claim 6, wherein the heat exchanger engagement portion and the mounting portion are integral.

12. The bracket of claim 6, wherein the heat exchanger engagement portion and the mounting portion are over-molded together.

13. The bracket of claim 6, wherein the heat exchanger engagement portion and the mounting portion are bonded together.

14. The bracket of claim 6, wherein the heat exchanger engagement portion and the mounting portion are bonded together by an adhesive.

15. The bracket of claim 6, wherein the mounting portion is a flange defining an aperture.

16. The bracket of claim 6, wherein each one of the first sidewall and the second sidewall includes a first portion and a second portion extending at a right angle relative to the second portion;
    wherein the portion of the heat exchanger is a corner of the heat exchanger; and
    wherein the first sidewall and the second sidewall are spaced apart to receive the corner of the heat exchanger therebetween.

17. The bracket of claim 6, wherein the first sidewall and the second sidewall are spaced apart to receive a header of the heat exchanger therebetween.

18. The bracket of claim 6, wherein the first sidewall and the second sidewall are spaced apart to receive a side plate of the heat exchanger therebetween.

19. The bracket of claim 6, wherein the mounting structure is one of a vehicle frame, vehicle chassis, and a secondary heat exchanger.

* * * * *